Patented Sept. 28, 1948

2,450,260

UNITED STATES PATENT OFFICE 2,450,260

TREATMENT OF FLOUR FOR CONTROLLING ITS STRENGTH

Herbert Horace Ward, Grange-over-Sands, England

No Drawing. Application April 6, 1943, Serial No. 482,011. In Great Britain May 13, 1942

1 Claim. (Cl. 99—91)

This invention relates to the treatment of flour and has for its object to produce from variable wheat mixtures, flours of any desired strength so as to enable the miller to ensure uniformity of strength to meet any particular requirement.

Millers have to use wheat mixtures of varying strength depending on the wheats available at different periods of the year and consequently the strength of the flour varies in accordance with the wheats used. When, for instance, a large proportion of the wheat imported into this country is of a strong type, the flour produced from it is unsuitable for biscuit making, cake flour and the like which require a weak flour. Indian wheats of the Karachi type have gluten of a tough and non-extensible character so that they are unsuitable for many purposes. The gluten of flours during storage becomes progressively shorter with age until a condition is reached where it is impossible to wash out any gluten from the flour.

It has been proposed to improve gluten containing flour by mixing with it approximately 1% to 7% of a flour previously treated with a member of the group consisting of sulphur dioxide, sulphurous acid, sodium bisulphite, sodium meta-bisulphite, sodium pyrosulphite, sodium hydrosulphite, organic addition compounds of sodium hydrosulphite with aldehydes and ketones, and sodium sulphite in an amount not more than the equivalent in gluten softening properties of 1% of sodium sulphite. In such proposal it was specifically suggested that 5,000 parts wheat flour be treated with one part by weight of gaseous sulphur dioxide, the flour being subsequently agitated for one hour at 230° F. to remove any non-absorbed sulphur dioxide, after which the treated flour is added in proportions of from 1% to 7% to an untreated flour. It is further stated in connection with such proposal that the sulphur dioxide or gluten modifying agent is usually eliminated from the dough or edible product during subsequent processing operations so that it is substantially undetectable in the final product.

By research and experiment, I have found that when sulphur dioxide is added directly to or generated in dry flour, there is a residual of $SO_2$ very little less than the quantity added thereto or generated therein and this residual decreases only slowly on standing, thereby indicating that the reaction between $SO_2$ and flour is a very slow one. Any measurable residual of $SO_2$ renders the flour unsaleable under the Sale of Food and Drugs Acts even though such $SO_2$ may be subsequently eliminated in the bread making or doughing and baking processes.

As a result of my researches and experiments, I have discovered that if the $SO_2$ is added to or generated in the whole of the flour in the presence of heat and moisture in the form of steam or hot moist air, there is a substantially instantaneous reaction between the $SO_2$ and flour, and if the quantity of $SO_2$ is not more than about 1 oz. per sack of 280 lbs. of a strong flour e. g. Manitoba or Karachi, such maximum decreasing when treating flours of less strength, so that for example in the case of an average English flour, the maximum addition of $SO_2$ would be about ¼ oz. per sack, with an increase in the moisture due to the treatment of up to about 0.5%, the $SO_2$ residual is immediately brought very low or immeasurable and the flour can be sacked off and stored safely.

My invention comprises the subjection of the whole of the flour to the action of $SO_2$ gas or of a compound or mixture containing or capable of generating $SO_2$ gas, in the presence of heat and moisture in the form of steam or hot moist air, there being always a low concentration of sulphur dioxide relative to steam or hot moist air, the weight of $SO_2$ added being up to 1 oz. per sack (280 lbs.) of a strong flour (e. g. Manitoba or Karachi) with a decrease in such addition for a weaker flour, and the weight of moisture added increasing the moisture content of the flour up to not more than about 0.5%, whereby a substantially instantaneous reaction between the $SO_2$ and the flour is obtained and the $SO_2$ residual is immediately brought very low or made immeasurable.

The treatment may be effected by introducing $SO_2$ gas and steam through separate valves into a reaction chamber where thorough mixing can take place. The mixed gas and steam may be led into the flour stream whilst it is being agitated. By this means a thoroughly uniform mixing treatment is ensured, it being essential that at no time shall there be a high concentration of $SO_2$ relatively to steam.

The amount of $SO_2$ added will depend upon the strength of the flour and the purpose for which it is required and is of the order ¼ oz. to 1 oz. per sack of 280 lbs. The temperature and moisture content of the flour are not seriously increased and the flour may be sacked off and stored safely. The residual of $SO_2$ is negligible.

By the use of my invention, flour from any wheat or wheat mixture can have its gluten so modified that it can be used for any purpose where weak flours are called for such as cake making or biscuit manufacture. Further, in the case of flours which have been stored for a length of time which has rendered the gluten very short, my treatment has the effect of reversing the ageing effect and restores the gluten to its original condition of extensibility. In addition flours intended for storage, if treated by my process, may be kept for longer periods than usual before deterioration becomes excessive. This is important at the present time when storage for security reasons is essential.

What I claim is:

The subjection of flour to the action of $SO_2$ gas in the presence of steam, there being always a low concentration of $SO_2$ relative to the steam, the weight of $SO_2$ added to the flour varying from about 1 oz. per sack of 280 pounds for a strong flour to ¼ oz. for a weaker flour, and the weight of moisture added increasing the moisture content of the flour up to not more than about 0.5%, whereby a substantially instantaneous reaction between the $SO_2$ and flour is obtained and the $SO_2$ residual is immediately brought very low or made immeasurable.

HERBERT HORACE WARD.

REFERENCES CITED

The following references are of record in the file of this patent:

UNITED STATES PATENTS

| Number | Name | Date |
|---|---|---|
| 805,709 | Caldwell et al. | Nov. 28, 1905 |
| 886,887 | Stephens | May 5, 1908 |
| 1,073,985 | Herendeen | Sept. 23, 1913 |
| 1,214,526 | Ellis | Feb. 6, 1917 |
| 1,300,604 | Greville | Apr. 15, 1919 |
| 1,957,688 | Blish | May 8, 1934 |

FOREIGN PATENTS

| Number | Country | Date |
|---|---|---|
| 2,778 | Great Britain | 1911 |
| 21,012 | Great Britain | 1912 |